United States Patent
Tsuzuki (10) Patent No.: US 9,258,555 B2
(45) Date of Patent: Feb. 9, 2016

(54) APPARATUS AND METHOD FOR DETERMINING DEFECT PIXEL

(71) Applicant: HANWHA TECHWIN CO.,LTD., Changwon-Si (KR)

(72) Inventor: Takeru Tsuzuki, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 125 days.

(21) Appl. No.: 14/010,978

(22) Filed: Aug. 27, 2013

(65) Prior Publication Data

US 2014/0063266 A1 Mar. 6, 2014

(30) Foreign Application Priority Data

Aug. 29, 2012 (JP) .................................. 2012-188468
May 27, 2013 (KR) ......................... 10-2013-0059927

(51) Int. Cl.
*H04N 17/00* (2006.01)
*H04N 5/367* (2011.01)

(52) U.S. Cl.
CPC ........... *H04N 17/002* (2013.01); *H04N 5/3675* (2013.01)

(58) Field of Classification Search
CPC ..... H04N 5/357; H04N 5/367; H04N 5/3675; H04N 5/2171; H04N 5/2176; H04N 1/4097; H04N 17/002
USPC ......... 348/175–180, 187, 189, 241, 243, 244, 348/246, 247, 250, 251
See application file for complete search history.

(56) References Cited

U.S. PATENT DOCUMENTS

| | | | | |
|---|---|---|---|---|
| 2005/0231617 | A1* | 10/2005 | Kitani | H04N 9/646 348/246 |
| 2006/0238629 | A1* | 10/2006 | Sato | H04N 5/367 348/241 |
| 2008/0266428 | A1* | 10/2008 | Egawa | H04N 5/367 348/246 |
| 2011/0001853 | A1* | 1/2011 | Sato | H04N 5/3675 348/246 |
| 2012/0093363 | A1* | 4/2012 | Hoshikawa | H04N 5/367 382/103 |

FOREIGN PATENT DOCUMENTS

| | | |
|---|---|---|
| JP | 2008-067158 A | 3/2008 |
| JP | 2009-290653 A | 12/2009 |
| JP | 2010-237018 A | 10/2010 |
| JP | 2011-135566 A | 7/2011 |
| KR | 10-2008-0015548 A | 2/2008 |
| KR | 10-2012-0066252 A | 6/2012 |

* cited by examiner

*Primary Examiner* — Twyler Haskins
*Assistant Examiner* — Peter Chon
(74) *Attorney, Agent, or Firm* — Sughrue Mion, PLLC (57) ABSTRACT

Provided is an apparatus of determining a defect pixel which includes at least one of a first edge periphery defect determiner and a second edge periphery defect determiner, wherein the first edge periphery defect determiner is configured to determine if a central pixel of a pixel group is the defect pixel by using pixel values of pixels adjacent to the central pixel disposed close to an image edge, wherein the edge includes at least one of right, left, upper, lower, lower-left, lower-right, upper-left and upper-right pixels of the central pixel, and wherein the second edge periphery defect determiner is configured to determine if the central pixel is the defect pixel by using a pixel disposed at at least one of the lower-left, lower-right, upper-left and upper-right of the central pixel.

20 Claims, 8 Drawing Sheets

Pmax = MAX(P1,P2,P4,P6,P7)  ... (EQUATION 1)
Pmin = MIN (P1,P2,P4,P6,P7)  ... (EQUATION 2)

if      (Pc > = Pmax){DIST = Pc – Pmax;}
else if (Pc < = Pmin){DIST = Pmin – Pc;}  ... (EQUATION 3)
else                 {DIST = 0;}

(1) DIST > TH1                              ... (CONDITION 1)
(2) Pmax – Pmin < TH2                       ... (CONDITION 2)
(3) MAX(P3,P5,P8) – MIN(P3,P5,P8) < TH3     ... (CONDITION 3)

| P3 |  | P5 |  | P8 |
|----|--|----|--|----|
|    |  |    |  |    |
| P2 |  | Pc |  | P7 |
|    |  |    |  |    |
| P1 |  | P4 |  | P6 |

Pmax = MAX(P2,P3,P4,P5,P6,P7,P8)        ... (EQUATION 4)
Pmin = MIN (P2,P3,P4,P5,P6,P7,P8)        ... (EQUATION 5)

if      (Pc >= Pmax){DIST = Pc – Pmax;}
else if (Pc <= Pmin){DIST = Pmin – Pc;}    ... (EQUATION 3)
else                {DIST = 0;}

(1) DIST > TH1                           ... (CONDITION 1)
(2) Pmax – Pmin < TH2                    ... (CONDITION 2)

| P1 |    | P4 |    | P6 |
|    |    |    |    |    |
| P2 |    | Pc |    | P7 |
|    |    |    |    |    |
| P3 |    | P5 |    | P8 |

FIG. 8

| DEFECT DETERMINATION | | CORRECTION VALUE |
|---|---|---|
| DYNAMIC DEFECT DETERMINATION | | (P2+P4+P5+P7) / 4 |
| EDGE PERIPHERY DEFECT DETERMINATION 1 | LEFT EDGE | (P2 + P7) / 2 |
| | RIGHT EDGE | |
| | UPPER EDGE | (P4 + P5) / 2 |
| | LOWER EDGE | |
| EDGE PERIPHERY DEFECT DETERMINATION 2 | LEFT EDGE | (P2+P4+P5+P7) / 4 |
| | RIGHT EDGE | |
| | LEFT EDGE | |
| | RIGHT EDGE | |

APPARATUS AND METHOD FOR DETERMINING DEFECT PIXEL

CROSS-REFERENCE TO RELATED PATENT APPLICATIONS

This application claims priority from Japanese Patent Application No. 2012-0188468, filed on Aug. 29, 2012, in the Japanese Patent Office and Korean Patent Application No. 10-2013-0059927, filed on May 27, 2013, in the Korean Intellectual Property Office, the disclosures of which are incorporated herein in their entirety by reference.

BACKGROUND

1. Field

Apparatuses and methods consistent with exemplary embodiments relate to determining a defect pixel.

2. Description of the Related Art

As technology for correcting a defect of a camera sensor, there are static type defect correction technology and dynamic type defect correction technology. In the static type defect correction technology, a defect pixel is detected by inputting an all-black image or an all-white image in releasing a product, and a position of the defect pixel is stored in a memory. In use, the position of the defect pixel is read from the memory, a pixel value of the defect pixel is substituted with a value that is calculated by using pixels neighboring to the defect pixel.

Such a static type defect correction technology has following problems. As the number of pixels increases, a large-capacity memory is needed for memorizing positions of defect pixels. As a defect detecting operation is required in releasing a product, costs increase. Also, it is unable to respond to a defect which is caused by a temperature change or elapse of a long time. For this reason, a demand for the dynamic type defect correction technology is increasing.

As the dynamic type defect correction technology, for example, there are technologies disclosed in the following patent documents.

(Patent Document 1) Japanese patent laid-open publication No. H2009-290653
(Patent Document 2) Japanese patent laid-open publication No. H2011-135566
(Patent Document 3) Japanese patent laid-open publication No. H2008-067158

SUMMARY

However, a method disclosed in patent document 1 is a related art defect correction method. In this method, merely calculating a difference value between an average value of pixel values of eight pixels neighboring to a corresponding pixel and a pixel value of the corresponding pixel has a great adverse effect, and it is required to add a condition such as all pixel values of the neighboring pixels becoming farther away from the pixel value of the corresponding pixel actually. In this case, a defect pixel neighboring to an edge having a value close to a defect pixel cannot be determined as a defect, and for this reason, the defect pixel can remain without being corrected.

A method disclosed in patent document 2 is a defect correction method different from the method disclosed in patent document 1. In this method, a defect determining condition is limited to a case in which a pixel value of a corresponding pixel in a setting window is the maximum value, and a defect pixel neighboring to an edge having a value close to a defect pixel cannot fully be determined as a defect, for which reason the defect pixel can also remain without being corrected.

A method disclosed in patent document 3 is a defect correction method different from the methods respectively disclosed in patent documents 1 and 2. In this method, when a setting for reducing an adverse effect is made, a defect pixel neighboring to an edge having a value close to a defect pixel cannot fully be determined as a defect, and for this reason, the defect pixel can also remain without being corrected.

Thus, one or more exemplary embodiments of the inventive concept provide technology which, even when a defect pixel is neighboring to an edge having a pixel value close to a pixel value of a corresponding defect pixel, can determine the corresponding defect pixel as a defect pixel.

According to an aspect of an exemplary embodiment, there is provided an apparatus for determining a defect pixel, including: a first difference calculating unit configured to calculate a first difference value between a first maximum value and a first minimum value among a plurality of pixel values of a first pixel group including first pixels which are adjacent to a central pixel and on the same color layer as the central pixel; a second difference calculating unit configured to calculate a second difference value between a second maximum value and a second minimum value among a plurality of pixel values of a second pixel group including second pixels which are adjacent to the central pixel and on the same color layer as the central pixel; and a determination unit configured to determine whether the central pixel is a defect pixel, on the basis of a relationship between the first maximum value or the first minimum value and a pixel value of the central pixel, the first difference value, and the second difference value, wherein the central pixel is disposed at a center of a pixel group including the first and second pixel groups.

Even when there is a defect pixel neighboring to an edge having a pixel value close to a pixel value of the defect pixel, the defect pixel may be determined as a defect pixel. Particularly, even when there is a neighboring edge in a horizontal direction or a vertical direction with respect to a central pixel, the defect pixel determining apparatus may determine whether the central pixel is a defect pixel.

The determination unit may determine the central pixel as the defect pixel when the relationship between the first maximum value or the first minimum value and a pixel value of the central pixel satisfies a first condition, the first difference value satisfies a second condition, and the second difference value satisfies a third condition. When the first condition, the second condition, and the third condition are satisfied, the determination unit may determine the central pixel as a defect pixel.

The first condition may be a condition in which a value of the first maximum value subtracted from the pixel value of the central pixel is greater than a first threshold value when the pixel value of the central pixel is greater than the first maximum value. When the pixel value of the central pixel is greater than the first maximum value, the determination unit may determine whether the first condition is satisfied according to the condition, in which the value of the first maximum value subtracted from the pixel value of the central pixel is greater than the first threshold value, being satisfied.

The first condition may be a condition in which a value of the pixel value of the central pixel subtracted from the first minimum value is greater than the first threshold value when the pixel value of the central pixel is less than the first minimum value. When the pixel value of the central pixel is less than the first minimum value, the determination unit may determine whether the first condition is satisfied according to the condition, in which the value of the first minimum value subtracted from the pixel value of the central pixel is greater than the first threshold value, being satisfied.

The second condition may be a condition in which the first difference value is less than a second threshold value. The determination unit may determine whether the second condition is satisfied according to the condition, in which the first difference value is less than the second threshold value, being satisfied.

The third condition may be a condition in which the second difference value is less than a third threshold value. The determination unit may determine whether the third condition is satisfied according to the condition, in which the second difference value is less than the third threshold value, being satisfied.

The determining whether the central pixel is the defect pixel may be performed on a plurality of patterns that are obtained by rotating the first pixel group and the second pixel group by a predetermined angle with respect to the central pixel. The determination unit may determine a defect on a plurality of patterns as well as one pattern, thus determining a defect at a higher degree of precision.

According to an aspect of another exemplary embodiment, there is provided an apparatus for determining a defect pixel, including: a difference calculating unit configured to calculate a difference value between a maximum value and a minimum value among a plurality of pixel values of a pixel group in which one pixel is removed from respective pixels of four corners in the pixel group which is adjacent to a central pixel thereof and on the same color layer as the central pixel; and a determination unit configured to determine whether the central pixel is a defect pixel, on the basis of the difference value and a relationship between the maximum value or the minimum value and a pixel value of the central pixel.

Even when there is a defect pixel neighboring to an edge having a pixel value close to a pixel value of the defect pixel, the defect pixel may be determined as a defect pixel. Particularly, even when there is a neighboring edge in a horizontal direction or a vertical direction with respect to a central pixel, the defect pixel determining apparatus may determine whether the central pixel is a defect pixel.

The determination unit may determine the central pixel as the defect pixel when the relationship between the maximum value or the minimum value and the pixel value of the central pixel satisfies a first condition, and the difference value satisfies a second condition. When the first condition and the second condition are satisfied, the determination unit may determine the central pixel as a defect pixel.

The first condition may be a condition in which a value of the maximum value subtracted from the pixel value of the central pixel is greater than a first threshold value when the pixel value of the central pixel is greater than the maximum value. When the pixel value of the central pixel is greater than the first maximum value, the determination unit may determine whether the first condition is satisfied according to the condition, in which the value of the first maximum value subtracted from the pixel value of the central pixel is greater than the first threshold value, being satisfied.

The first condition may be a condition in which a value of the pixel value of the central pixel subtracted from the minimum value is greater than a first threshold value when the pixel value of the central pixel is less than the minimum value. When the pixel value of the central pixel is less than the first minimum value, the determination unit may determine whether the first condition is satisfied according to the condition, in which the value of the first minimum value subtracted from the pixel value of the central pixel is greater than the first threshold value, being satisfied.

The second condition may be a condition in which the difference value is less than a second threshold value. The determination unit may determine whether the second condition is satisfied according to the condition, in which the first difference value is less than the second threshold value, being satisfied.

The determining whether the central pixel is the defect pixel may be performed on a plurality of patterns that are obtained by rotating the pixel group by a predetermined angle with respect to the central pixel. The determination unit may determine a defect on a plurality of patterns as well as one pattern, thus determining a defect at a higher degree of precision.

According to an aspect of still another exemplary embodiment, there is provided a method of determining a defect pixel, including: calculating a first difference value between a first maximum value and a first minimum value among a plurality of pixel values of a first pixel group including first pixels which are adjacent to a central pixel and on the same color layer as the central pixel; calculating a second difference value between a second maximum value and a second minimum value among a plurality of pixel values of a second pixel group including second pixels which are adjacent to the central pixel and on the same color layer as the central pixel; and determining whether the central pixel is a defect pixel, on the basis of a relationship between the first maximum value or the first minimum value and a pixel value of the central pixel, the first difference value, and the second difference value, wherein the central pixel is disposed at a center of a pixel group including the first and second pixel groups.

According to an aspect of still another exemplary embodiment, there is provided a method of determining a defect pixel, including: calculating a difference value between a maximum value and a minimum value among a plurality of pixel values of a pixel group in which one pixel is removed from respective pixels of four corners in the pixel group adjacent to a central pixel and on the same color layer as the central pixel; and determining whether the central pixel is a defect pixel, on the basis of the difference value and a relationship between the maximum value or the minimum value and a pixel value of the central pixel.

Even when there is a defect pixel neighboring to an edge having a pixel value close to a pixel value of the defect pixel, the defect pixel may be determined as a defect pixel. Particularly, even when there is a neighboring edge in a horizontal direction or a vertical direction with respect to a central pixel, the defect pixel determining apparatus may determine whether the central pixel is a defect pixel.

BRIEF DESCRIPTION OF THE DRAWINGS

The above and other aspects will become more apparent by describing in detail exemplary embodiments thereof with reference to the attached drawings, in which.

DETAILED DESCRIPTION OF THE EXEMPLARY EMBODIMENTS

Hereinafter, exemplary embodiments of the inventive concept will be described in detail with reference to the accompanying drawings. Like reference numerals in the drawings denote like elements, and thus their repetitive description will be omitted.

Moreover, in the specification and drawing, a plurality of elements having the substantially same function may be differentiated from each other by adding other alphabet to the rear of like reference numeral. However, when it is not needed to specially differentiate a plurality of elements having the substantially same function, only like reference numeral is given.

Figure 1:
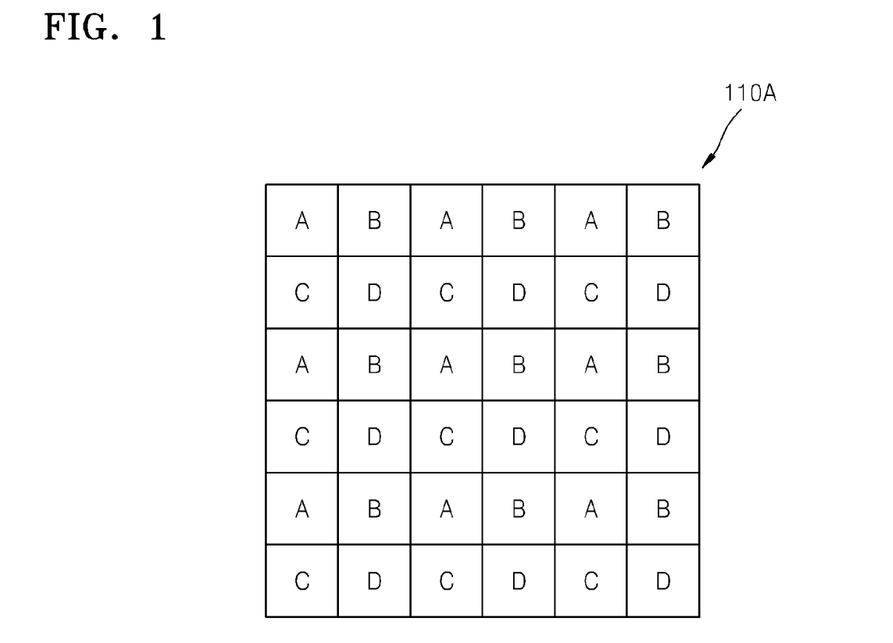
FIG. 1 is a diagram illustrating a configuration example of a four-primary-color sensor, according to an exemplary embodiment.

First, a type of sensor applicable to an exemplary embodiment will be described. FIG. 1 is a diagram illustrating a configuration example of a four-primary-color sensor applicable to exemplary embodiments described herebelow, according to an exemplary embodiment. In a description of FIG. 1, a four-primary-color sensor 110A will be described as an example of a sensor applicable to an exemplary embodiment, and as described below, the sensor applicable to an exemplary embodiment is not limited to the four-primary-color sensor 110A.

As illustrated in FIG. 1, the four-primary-color sensor 110A is a sensor in which four color filters respectively referred to as A, B, C and D are arranged in units of 2×2 pixels. However, if the four color filters detect light of different wavelength ranges, a configuration thereof is not specially limited. For example, the four color filters may have a configuration in which a white pixel is added to pixels of three primary colors (red (R), green (G), and blue (B)), have a configuration in which an infrared pixel is added to the pixels of three primary colors, or detect light of respective wavelength ranges which are obtained by quadrisecting a visible light range.

Hereinabove, a type of sensor applicable to an exemplary embodiment has been described. Next, problems of a related art are addressed using an exemplary embodiment in reference to FIG. 2. A related art dynamic defect determination method uses a condition in which a central pixel among 3×3 pixels on the same color layer is isolated. The same color layer corresponds to the same type of color filter in the four-primary-color sensor 110A of FIG. 1. Therefore, when there is a minimum of one pixel having the same value as a central pixel or a pixel having a value very similar to that of the central pixel in a 3×3 pixel group, the central pixel is not determined as a defect.

That is, the related art dynamic defect determination method can determine and remove most of defect pixels with respect to a planarization unit. However, if defect correction from an image M1 to an image M2 is performed as illustrated in FIG. 2, and there is a neighboring edge having the same or very similar value as a defect pixel, the defect pixel (for example, defect pixels R1 and R2) is not determined as a defect pixel, and thus, even after the defect correction, the defect pixel remains without being removed.

Figure 2:
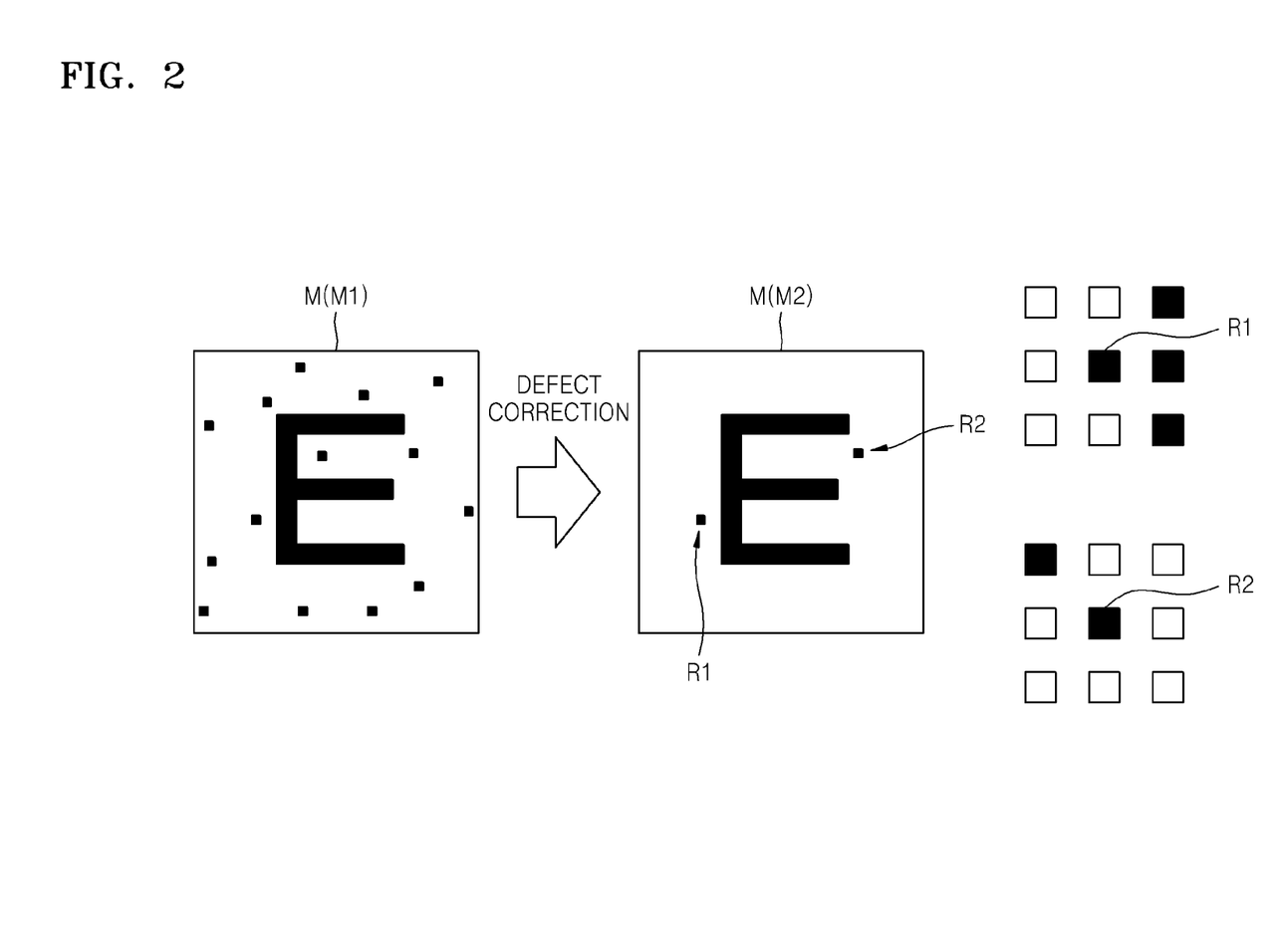
FIG. 2 is diagrams illustrating problems of a related art detection of a defect pixel.

For example, as shown in FIG. 2, three pixels (in more detail, a total of three pixels including one pixel at the upper-right of the defect pixel R1, one pixel at the right of the defect pixel R1, and one pixel at the lower-right of the defect pixel R1, which are on the same color layer as the pixel R1) at the right side of the defect pixel R1 and on the same color layer as the pixel R1 have the same pixel value as the defect pixel R1, and thus, the pixel R1 is not determined as a defect pixel. Also, one pixel at the upper-left of the defect pixel R2 and on the same color layer as the defect pixel R2 has the same pixel value as the defect pixel R2, and thus, the pixel R2 is not determined as a defect pixel.

The following exemplary embodiment provides technology in which even when there is a defect pixel neighboring to an edge having the same or very similar pixel value of a pixel value of a corresponding defect pixel, the corresponding defect pixel can be determined as a defect pixel at a high degree of precision.

Figure 3:
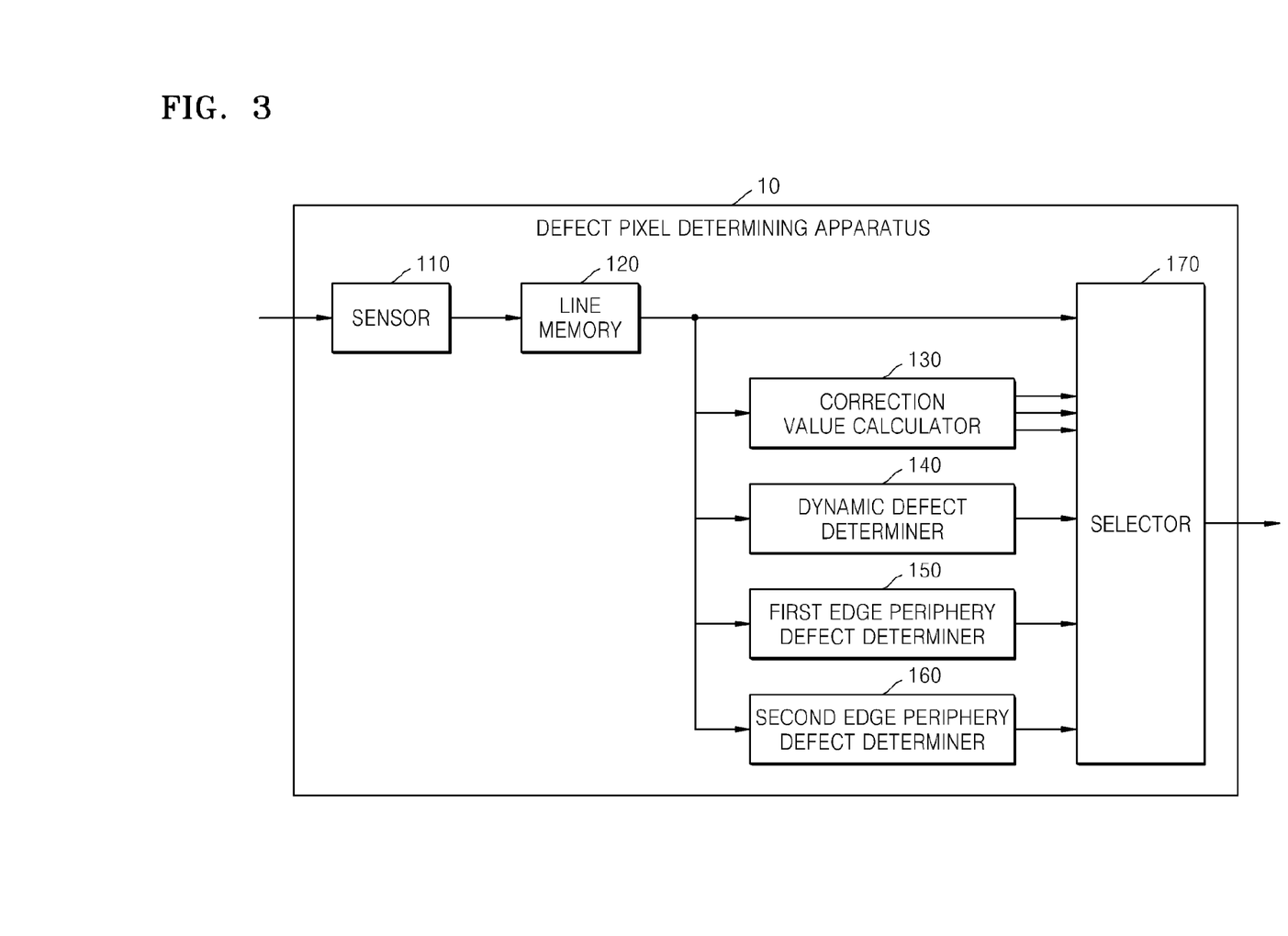
FIG. 3 is a diagram illustrating a configuration of a defect pixel determining apparatus according to an exemplary embodiment.

Below, a functional configuration of the defect pixel determining apparatus 10 according to an exemplary embodiment will be described. FIG. 3 is a diagram illustrating a configuration of the defect pixel determining apparatus according to an exemplary embodiment. As illustrated in FIG. 3, the defect pixel determining apparatus 10 includes a sensor 110, a line memory 120, a correction value calculator 130, a dynamic defect determiner 140, a first edge periphery defect determiner 150, a second edge periphery defect determiner 160, and a selector 170. Hereinafter, functions of these blocks or components included in the defect pixel determining apparatus 10 will be sequentially described in detail. These blocks or components are typically implemented in hardware, but may also be implemented in software or firmware.

The sensor 110 is configured with an image sensor that directs external light onto a light receiving plane of an image capturing device, converts the directed light into an electric charge, and converts the electric charge into an electrical signal. A type of image sensor is not specially limited, and for example, the image sensor may be a charge coupled device (CCD) or a complementary metal oxide semiconductor (CMOS). Further, in an example of FIG. 3, the sensor 110 is provided inside the defect pixel determining apparatus 10, but may be provided outside the defect pixel determining apparatus 10.

In an exemplary embodiment, as a configuration example of the sensor 110, the four-primary-color sensor 110A having only one pixel of each color among 2×2 pixels is used, and as described below, the sensor 110 is not limited to the example. A raw signal from the sensor 110 is stored in the line memory 120, and is read from the line memory 120 by the correction value calculator 130, the dynamic defect determiner 140, the first edge periphery defect determiner 150, the second edge periphery defect determiner 160, and the selector 170. For example, the raw signal is read as an image signal in units of five lines. In FIG. 3, the line memory 120 is provided inside the defect pixel determining apparatus 10. However, the line memory 120 may be provided outside the defect pixel determining apparatus 10 according to another exemplary embodiment.

When correction of a pixel value of a defect pixel is performed, the correction value calculator 130 calculates a post-correction pixel value, that is, a pixel value after correction (hereinafter referred to as "a correction value"). Here, the dynamic defect determiner 140, the first edge periphery defect determiner 150, and the second edge periphery defect determiner 160 are provided to determine a defect in the example of FIG. 3. Like this, when a plurality of blocks or components for determining a defect are provided inside the defect pixel determining apparatus 10, the correction value calculator 130 may calculate correction values corresponding to respective defect determinations, and supply the correction values to the selector 170. A detailed example of correction values will be described below with reference to FIG. 8. Further, when correction of a defect pixel is not needed, the defect pixel determining apparatus 10 may not include the correction value calculator 130.

The dynamic defect determiner 140, the first edge periphery defect determiner 150, and the second edge periphery defect determiner 160 sequentially select a central pixel from among a plurality of pixels, which form an image signal supplied from the line memory 120, to determine whether the central pixel is a defect pixel. The dynamic defect determiner 140 determines whether the central pixel is a defect pixel by using a defect determining condition based on the related art dynamic defect determination method. Further, the defect pixel determining apparatus 10 may not include the dynamic defect determiner 140.

Here, as described above, in the related art dynamic defect determination method, when there is a neighboring edge having the same or very similar pixel value as that of a defect pixel, this defect pixel is not determined as a defect pixel. According to an exemplary embodiment, however, the first edge periphery defect determiner 150 and the second edge periphery defect determiner 160 can determine this defect pixel as a defect pixel.

Specifically, even when there is a neighboring edge in a horizontal direction or a vertical direction with respect to a central pixel, the first edge periphery defect determiner 150 can determine whether the central pixel is a defect pixel. Also, even when there is a neighboring edge in an inclined direction with respect to the central pixel, the first edge periphery defect determiner 150 can determine whether the central pixel is a defect pixel.

In FIG. 3, the defect pixel determining apparatus 10 includes both the first edge periphery defect determiner 150 and the second edge periphery defect determiner 160. However, the defect pixel determining apparatus 10 may include one of the first edge periphery defect determiner 150 and the second edge periphery defect determiner 160. A detailed function of each of the first edge periphery defect determiner 150 and second edge periphery defect determiner 160 will be described below.

The selector 170 selects some correction values from among the correction values calculated by the correction value calculator 130 on the basis of determined results respectively supplied from the dynamic defect determiner 140, the first edge periphery defect determiner 150, and the second edge periphery defect determiner 160. A relationship between the determined results, which are respectively supplied from the dynamic defect determiner 140, the first edge periphery defect determiner 150, and the second edge periphery defect determiner 160, and a correction value selected by the selector 170 will be described below.

The correction value selected by the selector 170, for example, may be outputted to another device outside the defect pixel determining apparatus 10, and the other device may correct a corresponding defect pixel with the correction value. Further, when it is not needed to select a correction value (for example, when the dynamic defect determiner 140 is not provided, and only the second edge periphery defect determiner 160 is provided), the defect pixel determining apparatus 10 may not include the selector 170.

Moreover, as illustrated in FIG. 3, the correction value calculator 130, the dynamic defect determiner 140, the first edge periphery defect determiner 150, and the second edge periphery defect determiner 160 are provided in parallel in the defect pixel determining apparatus 10, and thus, it is not required to install more than one line memory like the line memory 120, thereby reducing a memory size of the line memory 120.

Hereinabove, the configuration of the defect pixel determining apparatus 10 according to the exemplary embodiment has been described.

Figure 4:
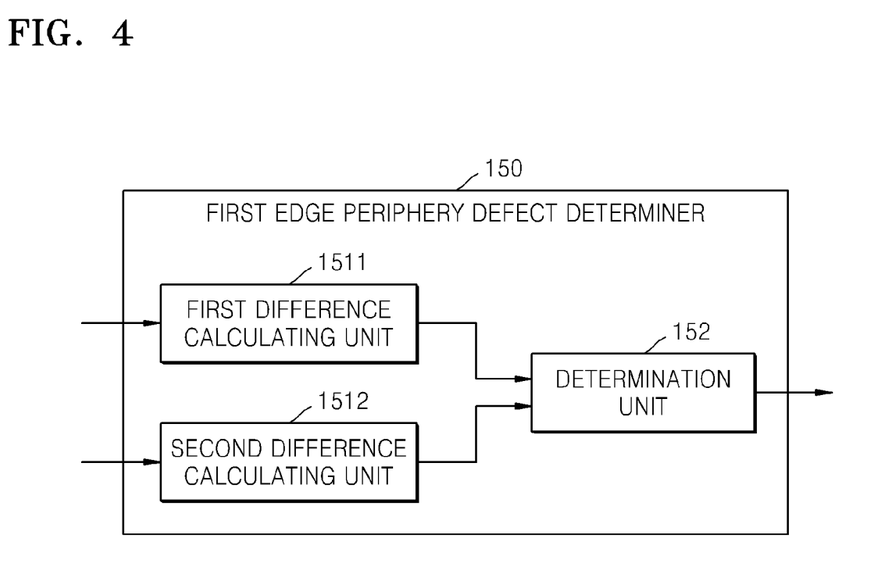
FIG. 4 is a diagram illustrating a configuration of a first edge periphery defect determiner of FIG. 3, according to an exemplary embodiment.
Figure 5:
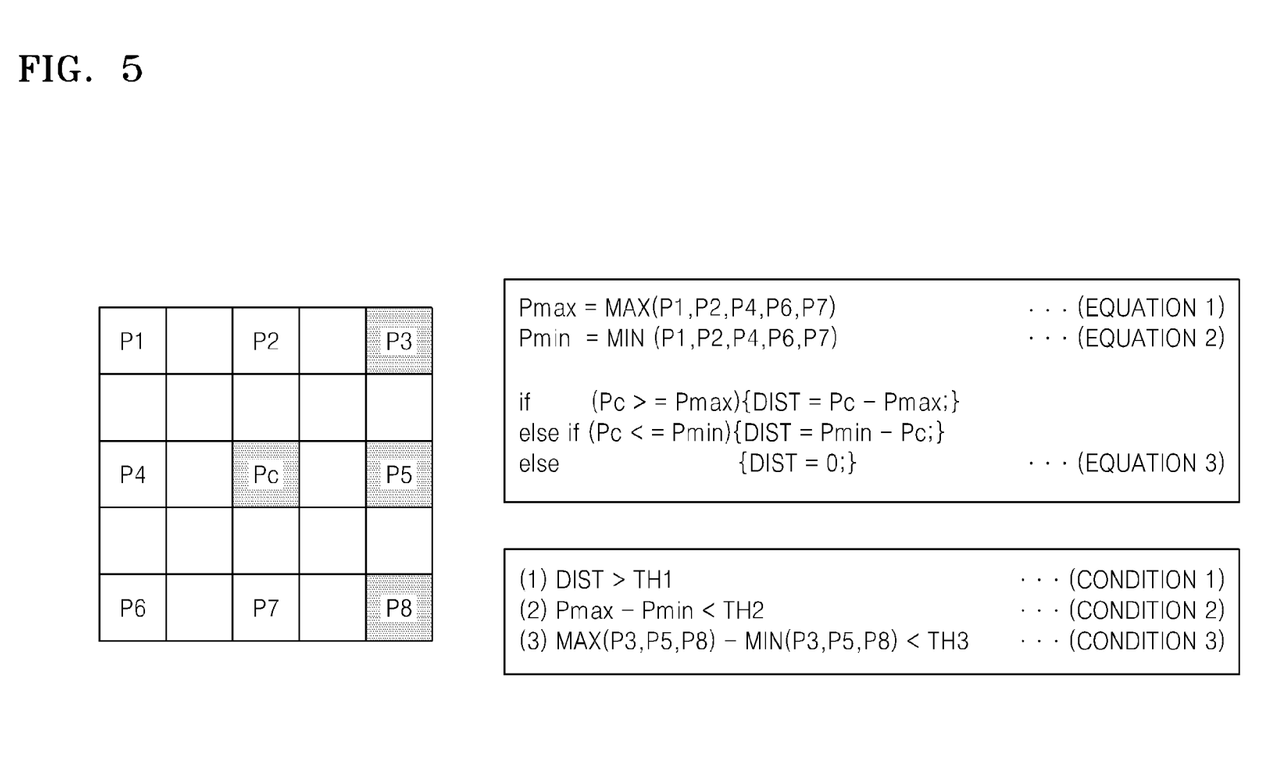
FIG. 5 is a diagram illustrating functions of the first edge periphery defect determiner of FIG. 3, according to an exemplary embodiment.

Next, a detailed configuration of the first edge periphery defect determiner 150 will be described. FIG. 4 is a diagram illustrating a configuration of the first edge periphery defect determiner 150 of FIG. 3, according to an exemplary embodiment. FIG. 5 is a diagram illustrating functions of the first edge periphery defect determiner 150 of FIG. 3, according to an exemplary embodiment. As illustrated in FIG. 4, the first edge periphery defect determiner 150 includes a first difference calculating unit 1511, a second difference calculating unit 1512, and a determination unit 152.

In the following description, as illustrated in FIG. 5, a central pixel is referred to as a central pixel Pc, and a pixel group which is on the same color layer as the central pixel Pc and adjacent to the central pixel Pc is divided into a first pixel group (pixel P1, pixel P2, pixel P4, pixel P1, pixel P6, and pixel P7) and a second pixel group (pixel P3, pixel P5, and pixel P8).

Moreover, as expressed in Equation 1 of FIG. 5, a first maximum value among pixel values of the first pixel group is expressed as Pmax =MAX(P1, P2, P4, P6, P7), and as expressed in Equation 2 of FIG. 5, a first minimum value among the pixel values of the first pixel group is expressed as Pmin=MIN(P1, P2, P4, P6, P7). Therefore, a first difference value between the first maximum value and the first minimum value is expressed as Pmax-Pmin.

Moreover, as expressed in Condition 3 of FIG. 5, a second maximum value among pixel values of the second pixel group is expressed as MAX(P3, P5, P8), and a second minimum value among the pixel values of the second pixel group is expressed as MIN(P3, P5, P8). In addition, as expressed in Condition 3 of FIG. 5, a second difference value between the second maximum value and the second minimum value is expressed as MAX(P3, P5, P8)-MIN(P3, P5, P8).

Here, the first difference calculating unit 1511 calculates Pmax-Pmin. Also, the second difference calculating unit 1512 calculates MAX(P3, P5, P8)-MIN(P3, P5, P8). The determination unit 152 determines whether the central pixel Pc is a defect pixel, on the basis of a relationship between Pmax or Pmin and a pixel value of the central pixel Pc, Pmax-Pmin, and MAX(P3, P5, P8)-MIN(P3, P5, P8).

As described above, even when there is a neighboring edge in a horizontal direction or a vertical direction with respect to the central pixel Pc, the defect pixel determination method can determine whether the central pixel Pc is a defect pixel. The determination method may be applied to a case in which the central pixel Pc is a white defect (a hot pixel), and a case in which the central pixel Pc is a black defect (a cold pixel).

In addition, FIG. 5 illustrates a case in which there is an edge in a vertical direction at the right of the central pixel Pc, but the method may be applied to a case in which there is an edge in the vertical direction at the left of the central pixel Pc, a case in which there is an edge in a horizontal direction above the central pixel Pc, and a case in which there is an edge in the horizontal direction under the central pixel Pc.

To apply the method to the above cases, determining whether the central pixel Pc is a defect pixel is performed on a plurality of patterns which are obtained by rotating the first pixel group (a pixel P1, a pixel P2, a pixel P4, a pixel P1, a pixel P6 and a pixel P7) and the second pixel group (a pixel P3, a pixel P5 and a pixel P8) by a predetermined angle with respect to the central pixel Pc. For example, when the predetermined angle is 90 degrees, the determining may be performed on four patterns which are obtained by rotating the first pixel group and the second pixel group by 90 degrees. Like this, by applying the method to the plurality of patterns, a defect can be determined at a higher degree of precision.

In performing determination on a plurality of patterns is performed, when the central pixel Pc is determined as a defect pixel in one of the plurality of patterns, the determination unit 152 may determine the central pixel Pc as a defect pixel. Also, when the central pixel Pc is not determined as a defect pixel in all of the plurality of patterns, the determination unit 152 may determine the central pixel Pc as not being a defect pixel.

In performing determination on a plurality of patterns which are obtained by rotating the first pixel group and the second pixel group by a predetermined angle, the same determination method described above in reference to FIG. 5 may be performed after the first pixel group and the second pixel group are rotated by the predetermined angle. Alternatively, determination (for example, determination on a pixel after a target pixel itself is rotated by the predetermined angle with respect to the central pixel Pc) different from the determination by rotating the first and second pixel groups may be performed.

A case in which the determination unit 152 determines the central pixel Pc as a defect pixel is not specially limited, but for example, the determination unit 152 may determine the central pixel Pc as a defect pixel in a case in which a relationship between Pmax or Pmin and a pixel value of the central pixel Pc satisfies a first condition, Pmax-Pmin satisfies a second condition, and MAX(P3, P5, P8)-MIN(P3, P5, P8) satisfies a third condition.

For example, as expressed in Equation 3 and Condition 1 of FIG. 5, the first condition may be a condition in which a value "Pc-Pmax" of Pmax subtracted from the pixel value of the central pixel Pc is greater than a first threshold value TH1 when the pixel value of the central pixel Pc is greater than Pmax. Also, as expressed in Equation 3 and Condition 1 of FIG. 5, the first condition may be a condition in which a value "Pmin-Pc" of the pixel value of the central pixel Pc subtracted from Pmin is greater than the first threshold value TH1 when the pixel value of the central pixel Pc is less than Pmin.

Moreover, for example, as expressed in Condition 2 of FIG. 5, the second condition may be a condition in which Pmax-Pmin is less than a second threshold value TH2. Also, for example, as expressed in Condition 3 of FIG. 5, the third condition may be a condition in which MAX(P3, P5, P8)-MIN(P3, P5, P8) is less than a third threshold value TH3.

Further, for example, the determination unit 152 may determine the central pixel Pc as not being a defect pixel in a case in which the relationship between Pmax or Pmin and the pixel value of the central pixel Pc does not satisfy the first condition, Pmax-Pmin does not satisfy the second condition, and MAX(P3, P5, P8)-MIN(P3, P5, P8) does not satisfy the third condition.

Hereinabove, the detailed functions of the first edge periphery defect determiner 150 included in the defect pixel determining apparatus 10 according to an exemplary embodiment has been described.

Figure 6:
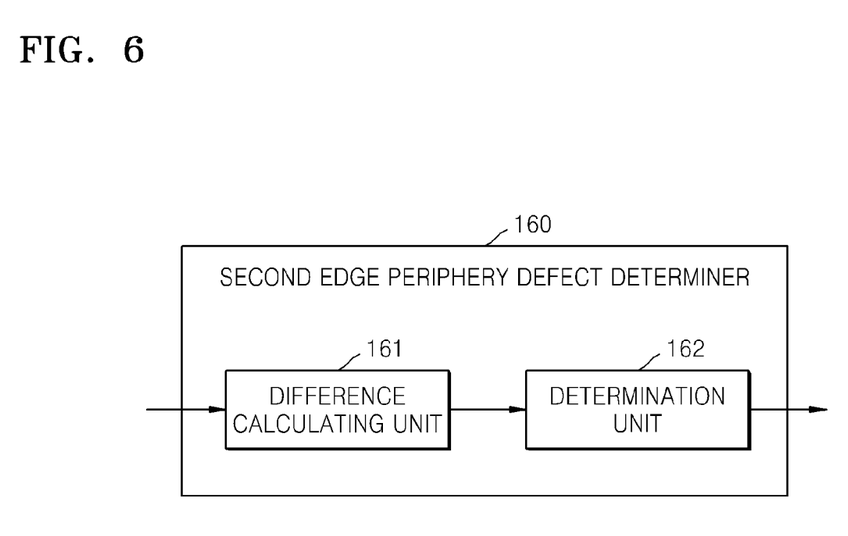
FIG. 6 is a diagram illustrating a configuration of a second edge periphery defect determiner of FIG. 3, according to an exemplary embodiment.
Figure 7:
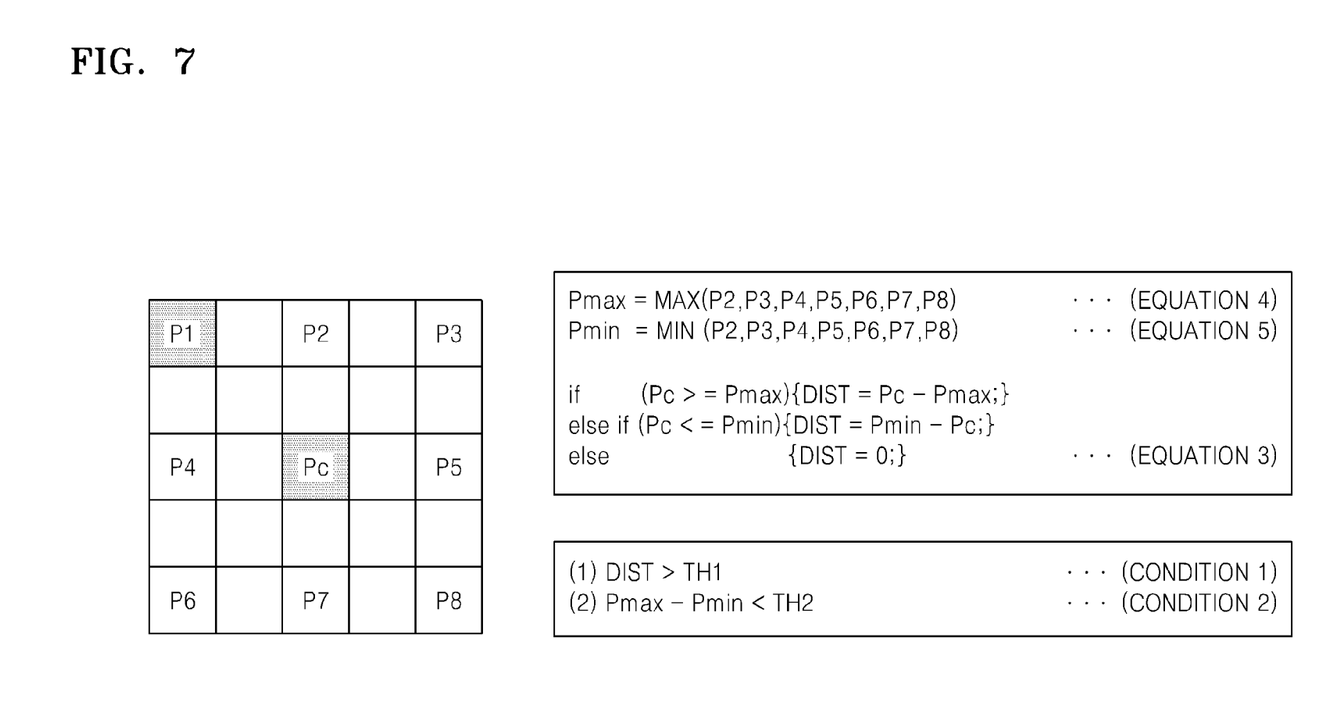
FIG. 7 is a diagram illustrating functions of the second edge periphery defect determiner of FIG. 3, according to an exemplary embodiment.

Next, a detailed configuration of the second edge periphery defect determiner 160 will be described. FIG. 6 is a diagram illustrating a detailed configuration of the second edge periphery defect determiner of FIG. 3, according to an exemplary embodiment. FIG. 7 is a diagram illustrating a detailed function of the second edge periphery defect determiner of FIG. 3, according to an exemplary embodiment. As illustrated in FIG. 6, the second edge periphery defect determiner 160 includes a difference calculating unit 161 and a determination unit 162.

In the following description, as illustrated in FIG. 7, a central pixel is referred to as a central pixel Pc, and a post-removal pixel group (pixel P2, pixel P3, pixel P4 and pixel P5, pixel P6, pixel P7 and pixel P8) in which one pixel (pixel P1) is removed from respective pixels of four corners in a pixel group (which is on the same color layer as the central pixel Pc) adjacent to the central pixel Pc is assumed.

Moreover, as expressed in Equation 4 of FIG. 7, the maximum value among pixel values of the post-removal pixel group is expressed as Pmax=MAX(P2, P3, P4, P5, P6, P7, P8), and as expressed in Equation 5 of FIG. 7, the minimum value among pixel values of the post-removal pixel group is expressed as Pmin=MIN(P2, P3, P4, P5, P6, P7, P8). Therefore, a difference value between the maximum value and the minimum value is expressed as Pmax-Pmin.

Here, the difference calculating unit 161 calculates Pmax-Pmin. Also, the determination unit 162 determines whether the central pixel Pc is a defect pixel, on the basis of a relationship between Pmax or Pmin and a pixel value of the central pixel Pc and Pmax-Pmin.

As described above, even when there is a neighboring edge in an inclined direction with respect to the central pixel Pc, the defect pixel determination method can determine whether the central pixel Pc is a defect pixel. The determination method may be applied to a case in which the central pixel Pc is the white defect (the hot pixel) and a case in which the central pixel Pc is the black defect (the cold pixel).

In addition, FIG. 7 illustrates a case in which there is an edge in an inclined direction at the upper-left of the central pixel Pc, but the method may be applied to a case in which there is an edge in the inclined direction at the lower-left, upper-right or lower-right of the central pixel Pc.

To apply the method to the above cases, determining whether the central pixel Pc is a defect pixel is performed on a plurality of patterns which are obtained by rotating the post-removal pixel group (P2, P3, P4, P5, P6, P7, P8) by a predetermined angle with respect to the central pixel Pc. For example, when the predetermined angle is 90 degrees, the determining may be performed on four patterns which are obtained by rotating the pixel group by 90 degrees. Like this, by applying the method to the plurality of patterns, a defect can be determined at a higher degree of precision.

In performing determination on a plurality of patterns is performed, when the central pixel Pc is determined as a defect pixel in one of the plurality of patterns, the determination unit 162 may determine the central pixel Pc as a defect pixel. Also, when the central pixel Pc is not determined as a defect pixel in all of the plurality of patterns, the determination unit 162 may determine the central pixel Pc as not being a defect pixel.

In performing determination on a plurality of patterns which are obtained by rotating the post-removal pixel group by a predetermined angle with respect to the central pixel Pc, the same determination method described above in reference to FIG. 7 may be performed after the post-removal pixel group is rotated by the predetermined angle. Alternatively, determination (for example, determination on a pixel after a target pixel itself is rotated by the predetermined angle with respect to the central pixel Pc) different from the determination by rotating the post-removal pixel group may be performed.

A case in which the determination unit 162 determines the central pixel Pc as a defect pixel is not specially limited, but for example, the determination unit 162 may determine the central pixel Pc as a defect pixel in a case in which a relationship between Pmax or Pmin and a pixel value of the central pixel Pc satisfies the first condition and Pmax-Pmin satisfies the second condition.

For example, as expressed in Equation 3 and Condition 1 of FIG. 7, the first condition may be a condition in which a value "Pc-Pmax" of Pmax subtracted from the pixel value of the central pixel Pc is greater than the first threshold value TH1 when the pixel value of the central pixel Pc is greater than Pmax. Also, as expressed in Equation 3 and Condition 1 of FIG. 7, the first condition may be a condition in which a value "Pmin-Pc" of the pixel value of the central pixel Pc subtracted from Pmin is greater than the first threshold value TH1 when the pixel value of the central pixel Pc is less than Pmin.

Moreover, for example, as expressed in Condition 2 of FIG. 7, the second condition may be a condition in which Pmax-Pmin is less than the second threshold value TH2. Also, for example, the first threshold value TH1 of FIG. 5 may be the same as the second threshold value TH2 of FIG. 7.

Further, for example, the determination unit 162 may determine the central pixel Pc as not being a defect pixel in a case in which the relationship between Pmax or Pmin and the pixel value of the central pixel Pc does not satisfy the first condition and Pmax-Pmin does not satisfy the second condition.

Hereinabove, the detailed function of the second edge periphery defect determiner 160 included in the defect pixel determining apparatus 10 according to an exemplary embodiment has been described.

Figure 8:
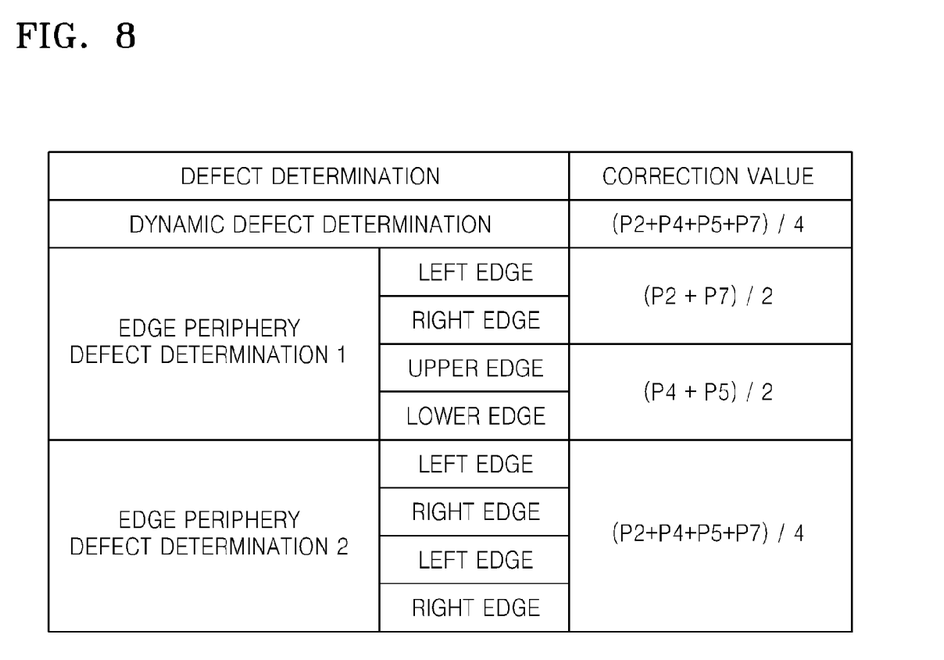
FIG. 8 is a diagram illustrating an example of a relationship between a type of defect determination and a correction value, according to an exemplary embodiment.

Herein, as described above, the correction value calculation method by the correction value calculator 130 is not specially limited. Hereinafter, an example of the correction value calculation method by the correction value calculator 130 will be described. FIG. 8 is a diagram illustrating an example of a relationship between a type of defect determination and a correction value. In addition, the correction value calculation method by the correction value calculator 130 is not limited to an example of FIG. 8.

As described above, a pixel value of a pixel determined as a defect pixel is substituted with, for example, the correction value calculated by the correction value calculator 130. As illustrated in FIG. 8, the correction value may vary according to whether defect determination (i.e., determination in which the central pixel Pc is a defect pixel) is performed by one of the dynamic defect determiner 140, first edge periphery defect determiner 150, and second edge periphery defect determiner 160.

For example, when defect determination is performed by the dynamic defect determiner 140, an average value of upper, lower, left, and right pixels (pixel P2, pixel P4, pixel P5, and pixel P7) with respect to the central pixel Pc may be used as a correction value.

Moreover, when defect determination is performed by the first edge periphery defect determiner 150, an average value of upper and lower pixels (pixel P2 and pixel P7) with respect to the central pixel Pc may be used as a correction value in a case in which there is an edge at the left or right of the central pixel Pc, and an average value of left and right pixels (pixel P4 and pixel P5) with respect to the central pixel Pc may be used as a correction value when there is an edge above or under the central pixel Pc.

When defect determination is performed by the first edge periphery defect determiner 150 and there is an edge at the left or right of the central pixel Pc, a direction of an edge is a horizontal direction. When defect determination is performed by the first edge periphery defect determiner 150 and there is an edge above or under the central pixel Pc, a direction of an edge is a vertical direction. Therefore, a functional block or component for determining whether a direction of an edge is the horizontal direction or the vertical direction may be provided, and the selector 170 may determine whether an edge is at the left or right of the central pixel Pc or above or under the central pixel Pc in the direction of the edge determined by the functional block or component. The selector 170 may also determine whether an edge is at the lower-left, lower-right, upper-left or upper-right of the central pixel Pc.

Moreover, when defect determination is performed by the second edge periphery defect determiner 160 and there is an edge at the upper-left, upper-right, lower-left, or lower-right of the central pixel Pc, an average value of upper, lower, left, and right pixels (pixel P2, pixel P4, pixel P5, and pixel P7) with respect to the central pixel Pc may be used as a correction value.

In an example of FIG. 8, a correction value to be used may be one of an average value of two upper and lower pixels, an average value of two left and right pixels, and an average value of four upper, lower, left, and right pixels. In this case, the correction value calculator 130 calculates the three correction values, and supplies the calculated correction values to the selector 170. The selector 170 selects a correction value on the basis of the determined results by the dynamic defect determiner 140, the first edge periphery defect determiner 150, and the second edge periphery defect determiner 160, and outputs the selected correction value to another device. When any defect determination is not performed, the selector 170 outputs an input pixel value without correction.

Since the determined results by the dynamic defect determiner 140, the first edge periphery defect determiner 150, and the second edge periphery defect determiner 160 can be supplied to the selector 170, the selector 170 can detect a plurality of defect determinations. In this case, an order for referring to the determined results may be predetermined, and the selector 170 may select a correction value corresponding to the first-detected defect determination. The order for referring to the determined results, for example, as illustrated in FIG. 8, may be the order of dynamic defect determination, edge periphery defect determination 1 (the determined result by the first edge periphery defect determiner 150), and edge periphery defect determination 2 (the determined result by the second edge periphery defect determiner 160), but is not specially limited.

Hereinabove, an example of the correction value calculation method by the correction value calculator 130 has been described.

According to the above embodiments, a defect pixel neighboring to an edge having the same or very similar pixel value as the defect pixel can also be determined as a defect pixel, and can be corrected and removed. This defect pixel cannot be removed by the related art dynamic defect correction. In a result of a preliminary experiment, by combining the related art dynamic defect correction and the edge periphery defect correction, a high defect removal rate equal to or higher than 99% can be achieved, and can minimize an adverse effect in which an image is damaged by misdetermining important image information as a defect to correct the important image.

The first edge periphery defect determiner 150 and the second edge periphery defect determiner 160 may perform only size comparison, addition, subtraction, and shift operation, and does not need multiplication and division. Operation delay and the like are minimized, and thus, an increase in a circuit scale or complexity is very small. Also, the first edge periphery defect determiner 150 and the second edge periphery defect determiner 160 may share and use a certain line (for example, five lines) used by the dynamic defect determiner 140, and thus, it is unnecessary to add the line memory 120. As described above, according to the above embodiments, mounting is also easy.

As described above, the exemplary embodiments can provide the technology which, even when a defect pixel is neighboring to an edge having the same or very similar pixel value as a pixel value of a corresponding defect pixel, can determine the corresponding defect pixel as a defect pixel.

While the present invention has been particularly shown and described with reference to exemplary embodiments thereof, it will be understood by those of ordinary skill in the art that various changes in form and details may be made therein without departing from the spirit and scope of the inventive concept as defined by the following claims.

For example, it is not required to use the correction value described in the example of FIG. 8 as a correction value, and a range of pixels used to calculate the correction value may be broadened up to a kernel size greater than a size of 5×5 pixels, or a pixel value of a color pixel different from the central pixel Pc may be used to calculate the correction value. One aspect of the exemplary embodiments is to provide a method of determining a defect having the same level near an edge.

Moreover, in the above embodiments, a case using the four-primary-color sensor has been mainly described. However, since one pixel of each color is included in each of 2×2 pixels, a three-primary-color bayer sensor is similar to R and B signals, and a technical problem does not occur even though the above embodiments are applied thereto. However, since the three-primary-color bayer sensor performs demosaicing by using G signals of two pixels among 2×2 pixels, resolution of the final image is high, and thus, it is needed to check a reduction in resolution due to an adverse effect of defect correction. Also, it should be noted that there is a possibility that a degree of precision of defect determination increases by referring to the G signal.

What is claimed is:

1. An apparatus for determining a defect pixel, the apparatus comprising:
    a first difference calculating unit configured to calculate a first difference value between a first maximum value and a first minimum value among a plurality of pixel values of a first pixel group comprising first pixels which are adjacent to a central pixel and on the same color layer as the central pixel;
    a second difference calculating unit configured to calculate a second difference value between a second maximum value and a second minimum value among a plurality of pixel values of a second pixel group comprising second pixels which are adjacent to the central pixel and on the same color layer as the central pixel; and
    a determination unit configured to determine whether the central pixel is a defect pixel, on the basis of a relationship between the first maximum value or the first minimum value and a pixel value of the central pixel, the first difference value, and the second difference value,
    wherein the central pixel is disposed at a center of a pixel group comprising the first and second pixel groups.

2. The apparatus of claim 1, wherein the determination unit is further configured to determine the central pixel as the defect pixel if the relationship between the first maximum value or the first minimum value and the pixel value of the central pixel satisfies a first condition, the first difference value satisfies a second condition, and the second difference value satisfies a third condition.

3. The apparatus of claim 2, wherein the first condition is a condition in which a value of the first maximum value subtracted from the pixel value of the central pixel is greater than a threshold value if the pixel value of the central pixel is greater than the first maximum value.

4. The apparatus of claim 2, wherein the first condition is a condition in which a value of the pixel value of the central pixel subtracted from the first minimum value is greater than a threshold value if the pixel value of the central pixel is less than the first minimum value.

5. The apparatus of claim 2, wherein the second condition is a condition in which the first difference value is less than a threshold value.

6. The apparatus of claim 2, wherein the third condition is a condition in which the second difference value is less than a threshold value.

7. The apparatus of claim 1, wherein the determining whether the central pixel is the defect pixel is performed on a plurality of patterns which are obtained by rotating the first pixel group and the second pixel group by a predetermined angle with respect to the central pixel.

8. An apparatus for determining a defect pixel, the apparatus comprising:
    a difference calculating unit configured to calculate a difference value between a maximum value and a minimum value among a plurality of pixel values of a pixel group in which one pixel is removed from respective pixels of four corners in the pixel group which is adjacent to a central pixel thereof and on the same color layer as the central pixel;
    a determination unit configured to determine whether the central pixel is a defect pixel, on the basis of the difference value and a relationship between the maximum value or the minimum value and a pixel value of the central pixel: and
    a correction value calculator configured to calculate a correction pixel value for the central pixel by averaging the pixel values of the pixel group from which the respective pixels of the four corners are removed.

9. The apparatus of claim 8, wherein the determination unit is further configured to determine the central pixel as the defect pixel if the relationship between the maximum value or the minimum value and the pixel value of the central pixel satisfies a first condition, and the difference value satisfies a second condition.

10. The apparatus of claim 9, wherein the first condition is a condition in which a value of the maximum value subtracted from the pixel value of the central pixel is greater than a threshold value if the pixel value of the central pixel is greater than the maximum value.

11. The apparatus of claim 9, wherein the first condition is a condition in which a value of the pixel value of central pixel subtracted from the minimum value is greater than a threshold value if the pixel value of the central pixel is less than the minimum value.

12. The apparatus of claim 9, wherein the second condition is a condition in which the difference value is less than a threshold value.

13. The apparatus of claim 9, wherein the determining whether the central pixel is the defect pixel is performed on a plurality of patterns which are obtained by rotating the pixel group by a predetermined angle with respect to the central pixel.

14. An apparatus of determining a defect pixel, the apparatus comprising:

a first edge periphery defect determiner configured to determine if a central pixel of a pixel group is the defect pixel by using pixel values of pixels adjacent to the central pixel disposed close to an edge of an image, the edge comprising at least one of right, left, upper, lower, lower-left, lower-right, upper-left and upper-right pixels of the central pixel; and a second edge periphery defect determiner configured to determine if the central pixel is the defect pixel by using a pixel disposed at at least one of the lower-left, lower-right, upper-left and upper-right of the central pixel; and a correction value calculator configured to calculate at least one correction pixel value for the central pixel corresponding to the determination of the at least one of the first edge periphery defect determiner and the second edge periphery defect determiner, wherein the at least one correction value is an average value of at least two of the right, left, upper, and lower pixels of the central pixel.

15. The apparatus of claim 14 further comprising a selector configured to select one of the at least one correction pixel value according to the determination of the at least one of the first edge periphery defect determiner and the second edge periphery defect determiner.

16. The apparatus of claim 14 further comprising a dynamic defect determiner configured to determine if the central pixel is the defect pixel by using pixel values of the pixels adjacent to the central pixel regardless of existence of the edge of the image.

17. The apparatus of claim 14, wherein the first edge periphery defect determiner comprises:
 a first difference calculating unit configured to calculate a first difference value between a first maximum value and a first minimum value among a plurality of pixel values of a first pixel group comprising first pixels which are adjacent to the central pixel and on the same color layer as the central pixel;
 a second difference calculating unit configured to calculate a second difference value between a second maximum value and a second minimum value among a plurality of pixel values of a second pixel group comprising second pixels which are adjacent to the central pixel and on the same color layer as the central pixel; and
 a determination unit configured to determine whether the central pixel is a defect pixel, on the basis of a relationship between the first maximum value or the first minimum value and a pixel value of the central pixel, the first difference value, and the second difference value,
 wherein the central pixel is disposed at a center of the pixel group comprising the first and second pixel groups.

18. The apparatus of claim 14, wherein the second edge periphery defect determiner comprises:
 a difference calculating unit configured to calculate a difference value between a maximum value and a minimum value among a plurality of pixel values of the pixel group in which one pixel is removed from respective pixels of four corners in the pixel group which is adjacent to the central pixel thereof and on the same color layer as the central pixel; and
 a determination unit configured to determine whether the central pixel is the defect pixel, on the basis of the difference value and a relationship between the maximum value or the minimum value and a pixel value of the central pixel.

19. A method of determining a defect pixel, the method comprising:
 calculating a first difference value between a first maximum value and a first minimum value among a plurality of pixel values of a first pixel group comprising first pixels which are adjacent to a central pixel and on the same color layer as the central pixel;
 calculating a second difference value between a second maximum value and a second minimum value among a plurality of pixel values of a second pixel group comprising second pixels which are adjacent to the central pixel and on the same color layer as the central pixel; and
 determining whether the central pixel is a defect pixel, on the basis of a relationship between the first maximum value or the first minimum value and a pixel value of the central pixel, the first difference value, and the second difference value,
 wherein the central pixel is disposed at a center of a pixel group comprising the first and second pixel groups.

20. A method of determining a defect pixel, the method comprising:
 calculating a difference value between a maximum value and a minimum value among a plurality of pixel values of a pixel group in which one pixel is removed from respective pixels of four corners in the pixel group adjacent to a central pixel and on the same color layer as the central pixel;
 determining whether the central pixel is a defect pixel, on the basis of the difference value and a relationship between the maximum value or the minimum value and a pixel value of the central pixel; and
 calculating a correction pixel value for the central pixel by averaging the pixel values of the pixel group from which the respective pixels of the four corners are removed.

* * * * *